United States Patent [19]
Burkhardt et al.

[11] 4,168,216
[45] Sep. 18, 1979

[54] HEAT-TREATED FLUOROCARBON SULFONAMIDE CATION EXCHANGE MEMBRANE AND PROCESS THEREFOR

[75] Inventors: Samuel F. Burkhardt, Painesville, Ohio; Daniel E. Maloney, Hockessin, Del.

[73] Assignees: Diamond Shamrock Corporation, Cleveland, Ohio; E. I. Du Pont de Nemours and Company, Wilmington, Del.

[21] Appl. No.: 946,172

[22] Filed: Sep. 27, 1978

[51] Int. Cl.$^2$ .......................... C25B 1/20; C25B 1/26; C25B 13/08
[52] U.S. Cl. ..................................... 204/98; 204/128; 204/296
[58] Field of Search .......................... 204/98, 128, 296

[56] References Cited
U.S. PATENT DOCUMENTS

| | | | |
|---|---|---|---|
| 4,026,783 | 5/1977 | Grot | 204/296 |
| 4,101,395 | 7/1978 | Motani et al. | 204/296 |

*Primary Examiner*—R. L. Andrews

[57] ABSTRACT

An ion exchange membrane of a fluorinated polymer which contains sulfonyl groups, wherein the sulfonyl groups on one surface of the membrane are in the form of N-monosubstituted sulfonamide groups formed from a di- or polyamine, is treated by heating at a temperature of 100° to 160° C. for a time of at least 15 minutes. The resulting membrane is useful as the membrane in a chloralkali electrolysis cell, and permits operation of such cells at high current efficiency over extended periods of time.

29 Claims, No Drawings

HEAT-TREATED FLUOROCARBON SULFONAMIDE CATION EXCHANGE MEMBRANE AND PROCESS THEREFOR

DESCRIPTION

Technical Field

This invention concerns improvements in and relating to fluorinated sulfonyl polymers which have been modified by reaction with a di- or polyamine and which are useful as cation exchange polymers, particularly to such polymers used in the form of films and membranes used in chloralkali electrolysis cells. More specifically, it relates to such films and membranes having improved performance characteristics, and to a process for making them by heating under specific conditions.

Background Art

Fluorinated ion exchange polymers, films and membranes having sulfonyl functional groups are known in the art. Typical examples of such polymers are those described in U.S. Pat. No. 3,282,875, U.S. Pat. No. 3,624,053, and U.S. Pat. No. 3,849,243. Improvements in the operating characteristics, such as current efficiency, of such films and membranes can be made by chemical modification such as by reaction with various amines, as disclosed in U.S. Pat. No. 4,085,071.

Further improvement in such films and membranes chemically modified by reaction with a di- or polyamine, in particular in their current efficiency, has been disclosed in U.S. Pat. No. 3,969,285. This patent describes a process wherein the indicated film or membrane is heated to a temperature between 170° C. and the degradation temperature of the reacted polymer for a period of time to increase permselectivity.

It has been found in practice, however, that the current efficiency exhibited by the membranes of U.S. Pat. No. 3,969,285, although initially high, gradually decreases with time to the point where, after a period ranging from a few days to a few months, it is sufficiently low that continued operation of a chloroalkali electrolysis cell containing such a membrane is no longer economically viable. Long-term performance at high current efficiency and low voltage, e.g. of the order of a year or more, is of real importance. The chloralkali industry is highly competitive, with a small profit margin. Shutdown of chloralkali cells for installation of new membrane at intervals of a few weeks to a few months incurs cost penalties in three different ways. First, the cost fluorinated sulfonyl ion exchange membranes per se is not insignificant, and scrapping them even at intervals of months for new would represent significant costs. Second, the disassembly of cells and reassembly with new membranes incurs significant labor costs. Third, in the period during which the cells are shut down for installation of new membrane, loss of production of chlorine and caustic represents a further economic penalty. Accordingly, it is readily seen that extending the useful life of the indicated membrane is a worthy goal. Thus, performance data over the longer term is more important and of greater significance than performance data from the first few days of cell operation.

It should be understood that the operating characteristics of all known ion exchange membranes when used in chloralkali cells, specifically their operating voltage, current efficiency and power consumption, degrade at some rate with time. While the ideal of no degradation in operating characteristics may never be attained, it is highly desirable to decrease the rate at which these characteristics degrade.

The above-described deficiencies are most apparent when one attempts to produce caustic at high concentrations, i.e., in the range of 30 to 40% by weight. While many different modifications of fluorinated ion exchange membranes having sulfonyl functionality have good operating characteristics when a chloralkali cell is operated to make caustic at a concentration of 10 to 20% by weight, their performance characteristics are poorer and deteriorate when conditions are altered to make 30 to 40% by weight caustic.

Additionally, power consumption is a very important factor in the operation of a commercial chloralkali cell plant. To maintain minimum power consumption, current efficiency should be above 90% and voltage should be at a minimum, preferably 4.0 volts or lower. In order to achieve minimum voltage it is important to use a low equivalent weight (EW) polymer, but the lower EW film suffers from being prone to cracking after the surface has been converted to sulfonamide with an amine. However, if the laminate is made first and then post-treated with the amine, the problem of surface cracks is reduced. Such membranes, even when heat treated in accordance with U.S. Pat. No. 3,696,285, have not exhibited good long-term current efficiency.

Disclosure of Invention

It has now been found that the useful life of the indicated membranes can be extended by heating them for at least 15 minutes at temperatures in the range of 100° to 160° C.

More specifically, according to the present invention, there is provided a process of heating a membrane which has a first layer formed from an intermediate fluorinated polymer containing pendant sulfonyl halide groups attached to carbon atoms which have at least one fluorine atom connected thereto, said polymer having an equivalent weight in the range of 700 to 1600, at least 40% of the sulfonyl halide groups to a depth of at least $2 \times 10^{-5}$ mm of said intermediate polymer on at least one side of said first layer having been reacted with a di- or polyamine wherein one amino group is primary and a second amino group is primary or secondary, said first layer being unsupported or having support material consisting of fibers of perfluorinated polymer therein, to a temperature of 100° to 160° C. for a time of at least 15 minutes. Membranes so treated are capable of extended continuous operation at high current efficiency.

There are also provided according to the invention new membranes having extended useful life, and a process for producing halogen and an alkali metal hydroxide by electrolysis of an alkali metal halide in an electrolytic cell having anode and cathode compartments separated by a membrane of the invention

Best Mode

The membranes dealt with in the present invention are fabricated from a fluorinated polymer having sulfonyl functionality. The sulfonyl groups are in such chemical form, usually —$SO_2Z$ groups where Z is Cl or F, preferably F, that they are stable during fabrication of the membrane from the polymer.

The melt-fabricable polymer having sulfonyl functional groups is typically a polymer having a fluorinated hydrocarbon backbone chain to which are attached the functional groups or pendant side chains which in turn carry the functional groups. The pendant side chains can contain, for example,

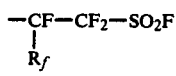

groups wherein $R_f$ is F, Cl, or a $C_1$ to $C_{10}$ perfluoroalkyl radical. Ordinarily, the functional group in the side chains of the polymer will be present in terminal

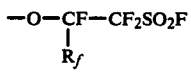

groups. Examples of fluorinated polymers of this kind are disclosed in U.S. Pat. No. 3,282,875, U.S. Pat. No. 3,560,568 and U.S. Pat. No. 3,718,627. More specifically, the polymers can be prepared from monomers which are fluorinated or fluorine substituted vinyl compounds, with at least one of the monomers coming from each of the two groups described below.

The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group

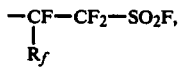

wherein $R_f$ is as defined above. Additional examples can be represented by the general formula $CF_2=CF-T-_k-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chloralkali cell. The most preferred polymers are free of both hydrogen and chlorine attached to carbon, i.e., they are perfluorinated, for greatest stability in harsh environments. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are $$CF_2=CFOCF_2CF_2SO_2F,$$

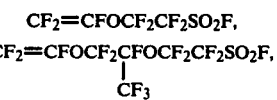

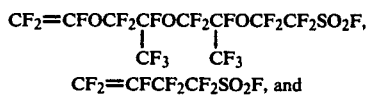

$$CF_2=CFCF_2CF_2SO_2F, \text{ and}$$

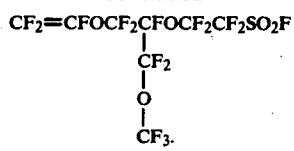

The most preferred sulfonyl fluoride containing comonomer is perfluoro(3,6-dioxa-4-methyl-7-octenesulfonyl fluoride),

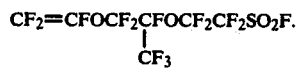

The sulfonyl-containing monomers are disclosed in such references are U.S. Pat. No. 3,282,875, U.S. Pat. No. 3,041,317, U.S. Pat. No. 3,718,627 and U.S. Pat. No. 3,560,568.

A preferred class of such polymers is represented by polymers having the repeating units

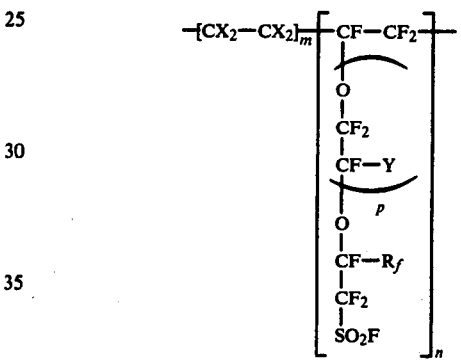

wherein
m is 3 to 15,
n is 1 to 10,
p is 0, 1 or 2,
the X's taken together are four fluorines or three fluorines and one chlorine,
Y is F or $CF_3$, and
$R_f$ is F, Cl or a $C_1$ to $C_{10}$ perfluoroalkyl radical.

The most preferred copolymer is a copolymer of tetrafluoroethylene and perfluoro(3,6-dioxa-4-methyl-7-octenesulfonyl fluoride) which comprises 20 to 65 percent, preferably 25 to 50 percent, by weight of the latter monomer.

When used in a film or membrane to separate the anode and cathode compartments of an electrolysis cell, such as a chloralkali cell, the polymer after conversion to ionizable form should have a total ion exchange capacity of 0.6 to 1.4 meq/g (milliequivalents/gram), preferably from 0.75 to 1.0 meq/g. Below an ion exchange capacity of 0.5 meq/g, the electrical resistivity becomes too high, and above 1.6 meq/g the mechanical properties are poor because of excessive swelling of the polymer. The values of m and n in the above formula of the copolymer should be adjusted or chosen such that the polymer has an equivalent weight in the range of 700 to 1600, preferably 1000 to 1300, and most preferably 1025 to 1200, for use as an ion exchange barrier in an electrolytic cell. Equivalent weight is the weight of polymer in grams which contains one equivalent of potential ion exchange capacity. The equivalent weight above which the resistance of a membrane becomes too high for practical use in an electrolytic cell varies somewhat with the thickness of the membrane. For thinner membranes, the higher equivalent weights can be tolerated, but for most purposes, however, and for membranes of ordinary thickness, equivalent weights in the preferred ranges are best.

Such copolymers used in the present invention can be prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0°–200° C. and at pressures in the range 1–200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2,2-trifluoroethane, and the like.

Aqueous techniques for preparing such copolymers include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

Such techniques are suitable for making polymer of high enough molecular weight to produce tough films in both the melt-fabricable precursor form and in the hydrolyzed ion-exchange form.

Such polymer in melt-fabricable form, e.g. with the sulfonyl groups present as $-SO_2F$ or $SO_2Cl$ groups, is fabricated into film and membranes by techniques well known in the art, such as melt pressing and extrusion. Temperatures and pressures will vary depending on the polymer composition. Temperature and pressure must be high enough to provide a coalesced tough film free of holes, but not so high as to cause polymer decomposition. Fabrication temperatures of about 150° C. to 350° C. are generally required, and for many of the polymers 180° C. to 290° C. is preferred. Pressures can vary widely, and can typically range from $10^5$ to $10^8$ pascals.

When the polymer is in the form of a film, desirable thicknesses of the order of 0.025 to 0.5 mm (0.001 to 0.02 inch) are ordinarily used. Excessive film thicknesses will aid in obtaining higher strength, but with the resulting deficiency of increased electrical resistance.

The term "membrane" refers to nonporous structures for separating compartments of an electrolysis cell. As used herein, this term is employed to refer to simple films of uniform composition, to films which may have layers of different materials, formed, for example, by surface modification of films or by lamination, e.g., polymers of different equivalent weight or different sulfonyl polymers, and to structures having as one layer a support material, such as a fabric imbedded therein. Laminar structures can be made by melt-pressing together layers of the desired composition.

The reinforcement fabric for encapsulation within the membrane can be either woven or unwoven, although a woven fabric is preferred. The individual fibers of the fabric should be able to withstand a temperature from about 240° C. to about 320° C., since these temperatures are employed in the laminating steps. With this proviso, the individual reinforcing fibers can be made from conventional materials, since their main purpose is to strengthen the membrane. Reinforcement materials made from insert polymers have been found to be preferred. By "inert" is meant, for example, inert under conditions found in a chloralkali cell. The polymers include those made from tetrafluoroethylene and copolymers of tetrafluoroethylene with hexafluoropropylene and/or perfluoro(alkyl vinyl ethers) with alkyl being 1 to 10 carbon atoms such as perfluoro (propyl vinyl ether). An example of a most preferred reinforcement material is polytetrafluoroethylene. Supporting fibers made from chlorotrifluoroethylene polymers are also useful. Fibers of perhalogenated polymers are preferred, and fibers of perfluorinated polymers are highly preferred. Such reinforcement fibers and their use to strengthen polymers in a membrane are well known in the prior art.

One suitable process for making a membrane having support material embedded therein is described in U.S. Pat. No. 3,770,567 and U.S. Pat. No. 3,925,135. Briefly, it involves starting with a film of fluorinated polymer having different functional groups on the two surfaces, for example, sulfonyl fluoride or sulfonyl chloride on a first surface and sulfonic acid metal salt or ammonium salt on the second surface (made by hydrolyzing the functional groups on only one surface of a film in which all of the functional groups are sulfonyl fluoride or chloride), placing the first surface in contact with a support material and heating the film and support material at 240°–320° C. while applying a specified differential pressure or opposite sides of the film and support material whereby the support material becomes encapsulated within the film.

Hydrolysis of a surface layer to the sulfonic acid salt form increases the physical strength thereof, and the integrity of the film during encapsulation of the support material is thereby maintained. The thickness of the hydrolyzed layer must be at least 0.01 mm, and is preferably at least 0.05 mm.

It is also possible to treat an unsupported film which is wholly in the sulfonyl halide form with a di- or polyamine on one side of the film, and then to embed the support material into the non-amine-treated side of the film.

Membranes which contain support material are stronger and more resistant to damage, as by tearing, and thus are preferred, especially for large cells which require a membrane of large area.

Under most circumstances, layered structures will be such that the first layer of polymer (sulfonyl halide) will be about 1 to 15 mils (0.025 to 0.38 mm) thick, the second layer of polymer (sulfonic acid salt) will be about ¼ to 5 mils (0.006 to 0.13 mm) thick, and the total thickness of the structure will be about 2 to 20 mils (0.05 to 0.5 mm) thick. The indicated thicknesses are effective film thicknesses, i.e., thicknesses which excluded reinforcing fibers and other members which do not contain ion exchange groups. When support fabric is present, it is normally from 8 to 15 mils thick. In the majority of cases when support fabric is present, the finished membrane will be such that the thickness of polymer film in the window areas (between the filaments) is substantially less than the thickness at the knuckles of the fabric (sites where the filaments of the fabric cross over one another).

The membrane, either a film of uniform composition of fluorinated polymer having sulfonyl fluoride or sulfonyl chloride functional groups, or a layered structure having a first layer of such fluorinated polymer, is treated with a di- or polyamine more fully defined below to effect reaction of the sulfonyl halide groups on at least one side of the first layer to form N-substituted sulfonamide groups.

The di- or polyamine used in this treatment has one amino group which is primary and a second amino group which is primary or secondary. Additional amino groups may be present so long as the above defined amino groups are present. Suitable examples include diamines which contain 2 to 10 carbon atoms, e.g. the formula $H_2N(CH_2)_qNH_2$, where q is an integer from 2 to 10. Other diamines and polyamines include propylenediamine, diethylene triamine, and triethylenetetramine. Good results are obtained with diamines having 2 or 3 carbon atoms, such as ethylenediamine, propylenediamine and trimethylenediamine, and in view of their easy availability they are preferred. Ethylenediamine is most preferred.

Treatment with the amine can be carried out with the amine alone or with the use of a diluent, carrier or solvent for the amine. Either reactive or inert carriers and solvents for the amine may be employed. A reactive carrier will compete with the amine during treatment of the pendant sulfonyl halide sites on the precusor polymer. A reactive carrier contains active hydrogen, such as in the case of water. Primary alcohols are not considered suitable since they react rapidly with the intermediate pendant sulfonyl halide groups to form sulfonic ester groups, which, being non-ionizable, thus lower the concentration of the desired ion exchange sites. The competitive reaction may also produce ion exchange sites in the fluorinated polymer disclosed herein since the sulfonyl halide is converted to $-SO_3^-$.

Inert solvents may be desirably employed which contain no active hydrogen atoms and do not promote a competing reaction. Examples include dimethyl formamide, dimethyl sulfoxide, tetramethylene sulfone, hexamethyl phosphoramide, acetonitrile, the dimethyl ether of diethylene glycol, and general classes of ethers and nitriles.

The temperature and pressure during treatment with amine can be varied over wide limits. The specific values of these parameters, along with the presence or absence of a diluent or reactive solvent, will determine the extent of conversion as well as the efficiency and time of conversion of the sulfonyl groups and will tend to influence the degree of penetration of the amine into the polymer. Illustratively, room temperature conversion has been found to be satisfactory for most amines. Pressure below, at, or above atmospheric pressure may be employed. With gaseous treatment, the proper combination of pressure and temperature will be employed to obtain the amine in the gaseous state. With gaseous treatment, an inert gas as a carrier may be employed.

While beneficial effects have been obtained with essentially complete or complete conversion of the active sulfonyl halide ($-SO_2X$ form) in a polymer layer or surface, it is within the scope of this disclosure to undertake the reaction to convert a minimum of sulfonyl groups. A preferred minimum conversion will be a minimum of 40 to 50%, or conversion of about a majority of the sulfonyl halide groups. As employed herein, "essentially complete conversion" denotes reaction of the di- or poly-amine with at least 90% of the sulfonyl halide groups. "Complete conversion" denotes reaction of the di- or poly-amine with at least 99% of the sulfonyl halide groups.

Reaction of the sulfonyl halide groups on a given side of the first layer should be to a depth of at least $2 \times 10^{-5}$ mm (200 angstroms), and is preferably to a depth of at least $10^{-3}$ mm (1 micron). Permeation of the amine into the membrane occurs uniformly, and the depth of penetration is easily determined by staining the treated membrane with a dye and looking at a cross-section of the membrane, as is more fully described in U.S. Pat. No. 3,969,285 and U.S. Pat. No. 4,085,071, the disclosures of which are incorporated herein by reference. From such physical observation after reaction with the amine, a sharp line of demarcation is seen between sulfonyl halide groups which have reacted with the amine and unreacted sulfonyl halide groups, if the polymer does not or is not allowed to completely react.

It is within the scope of this disclosure that more than surface conversion of the polymer takes place with the di- or poly-amines. A high degree of penetration into the polymer may take place by the amine and essentially complete reaction by the amine with conversion of the pendant sulfonyl groups may take place.

For the purpose of explanation only, without being bound to any theory or mechanism of reaction, it is believed that the treatment with di- and poly-amines converts the functional groups of the polymer predominantly to N-monosubstituted sulfonamido groups, as illustrated, in the case of ethylenediamine for example, by the formula $R_f-SO_2-NH-CH_2CH_2-NH_2$ where $R_f$ represents the backbone polymer. This structure is amphoteric, that is it contains both a weakly acidic group (the —NH— group linked to the sulfonyl group) and one or more weakly basic groups (the $NH_2$ groups). As a result, the resin can act as a cation or anion exchanger depending on the pH. In a moderately acidic medium (pH of less than 4), the basic group ionizes to form salts with anions. This is evidenced by the ability of the resin to be stained by the colored anion of an anionic dye. In this respect these functional groups are quite different from those derived from mono-amines.

In the strongly alkaline environment of a chloroalkali cell (pH of 13 or higher) however, the amino groups are unable to ionize. Instead, ionization occurs at the weakly acidic site with formation of the alkali metal salt

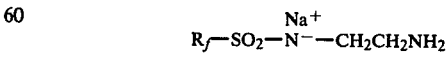

as evidenced by the fact that the membrane conducts electricity predominantly by the movement of cations.

In keeping with the above, the polymer formed by reaction with the amine, either before or after heat treatment, possesses a high electrical resistance. This disadvantage of high electrical resistance is overcome by formation of the salt of the amine, which formation may take place either before or after heat treatment carried out according to the invention.

In the case of membranes having a laminar structure and/or having a support material embedded therein, treatment with the di- or polyamine can be carried out either before or after the lamination or support embedment step. It is preferred, however, to do the treatment with the amine after any lamination and support embedment steps have been carried out, due in part to the fact that the amine treated layer is less subject to disturbance and will be more uniform and intact if the amine treatment is carried out following any lamination and support embedment steps.

In the case of a membrane having support material embedded therein, but having no surface hydrolyzed layer, although treatment with amine can be on either one or both sides of the membrane, it is preferred, for purposes of attaining lower operating voltages, that treatment with amine be done only on one side of the membrane, either the side on which the support material was embedded, or only on the reverse side, i.e., the side away from the side into which the support material was embedded.

In the case of a membrane having support material embedded therein and also having a surface hydrolyzed layer as described above, treatment with amine should be done only on the side into which the support material was embedded, i.e., the non-hydrolyzed surface, or on both surfaces. Surprisingly, amine appears to penetrate the surface hydrolyzed layer rapidly, as evidenced by the fact that when a membrane having a sulfonyl halide layer and a hydrolyzed layer on one surface is treated with amine on both sides, there is found, as determined by staining and cross-sectioning, not only a first sulfonamide layer on the exposed surface of what was the sulfonyl halide layer, but also a second sulfonamide layer in what was the sulfonyl halide layer lying just under the surface hydrolyzed layer. A film of polymer in the sulfonyl fluoride form, having no support material embedded therein but having a surface hydrolyzed layer, can also be treated with amine on only the sulfonyl halide side, or on both sides. The hydrolyzed polymer does not react with amine to form sulfonamide; it reacts only to form amine salts, from which sulfonic acid or metal salts thereof are regenerated upon treatment with acid or metal hydroxide solutions.

For use in ion exchange applications and in cells, for example a chloralkali cell for electrolysis of brine, the membrane should have all of the functional groups converted to ionizable functional groups. As the N-monosubstituted-sulfonamide groups and the functional groups in a surface hydrolyzed layer are ionizable, there remains only to convert any sulfonyl halide groups in the first layer to ionizable functional groups. Such conversion is ordinarily and conveniently accomplished by hydrolysis with acid or base, such that the sulfonyl halide groups are converted to the free acid or the alkali metal salt thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath. For a membrane which will be used in a chloralkali cell, hydrolysis with an alkali metal hydroxide is preferred, most preferably sodium hydroxide or potassium hydroxide, so that all of the ionizable groups will be in the form of the alkali metal salt, which form is desirable for a more rapid start-up of the cell when placed in operation.

In accordance with the present invention, the membrane is heated to a temperature of 100° to 160° C. for a time of at least 15 minutes. Preferably, heating will be for a time of 30 minutes to 2 days, and most preferably from 2 hours to 1 day. The heating time employed will be dependent on the temperature selected. Temperatures near the lower end of the indicated range will ordinarily require longer heating times, and temperatures near the upper end of the indicated range will require the shorter heating times.

The pressure during heat treating can be atmospheric or above or below atmospheric pressure. Atmospheric pressure, or sub-atmospheric pressure, i.e., under vacuum, is preferred. Heating can be done in apparatus of well known types, such as an oven. Heating can suitably be done in a gas such as air or nitrogen.

For the purpose of explanation only, it is believed that heating of the amine treated membrane results in crosslinking. During heating at temperatures above 100° C., the amine-treated membrane undergoes a weight loss, and ammonia is found in the gas evolved. The loss of the ability of the resulting membrane to be stained by anionic dyes suggests the destruction of the free amino group, i.e., the amino group not a part of the sulfonamide group. Furthermore, it is believed that crosslinking would result in lower water absorption by the polymer, and that the latter would in turn result in higher membrane permselectivity, which would be evident as the observed improvement in current efficiency in a chlor-alkali cell. The fact that heating of a fully amine-treated 1100 EW membrane lowers it weight gain in 28 weight % caustic by nearly 25%, as compared to a non-heat treated membrane, is further suggestive that heating is causing crosslinking.

The functional groups can be in either the acid form or the salt form during heat treatment. More specifically, the sulfonic acid groups can be present either as the free acid, or as an alkali metal or ammonium salt thereof, and the N-monosubstituted sulfonamide groups can be present either in the amide form, or as an alkali metal or ammonium salt thereof. Interconversion between the salt and the acid forms is readily accomplished by treatment with an appropriate acid or base. In one common embodiment, the membrane during heat treatment is in the form where the sulfonic acid groups are present as the potassium or sodium salt and the N-monosubstituted sulfonamide groups are present in the acid amide (i.e., not the salt) form. Such membranes result from a procedure wherein the final hydrolysis step of remaining sulfonyl halide groups is carried out with an aqueous potassium or sodium hydroxide solution, followed by a wash with acetic acid solution to leach excess base from the membrane and neutralize it; while the acetic acid, being a weak acid, converts the amide salt back to the free amide form, it is too weak an acid to convert the sulfonic acid salt groups to free sulfonic acid groups.

In the case of a membrane which is laminated or which has support material embedded therein, while it is possible to carry out the invention with a membrane which is treated with amine either before or after any such lamination or support embedment step, it is preferred to treat with amine after lamination or support embedment. It has been found that excessive exposure of membranes to high temperatures should be avoided so as to minimize detrimental effects such as higher voltage and lower current efficiency. Embedment of support material or lamination requires heating to a temperature at which the polymer softens and flows, most often for the polymers generally employed in the range of 180° to 290° C. Accordingly, to realize the greatest improvement in current efficiency and voltage, it is highly preferred to heat treat at temperatures of 100° to 160° C. a membrane which has been treated with amine after any lamination or support embedment step, which procedure avoids any exposure of amine-treated polymer to high temperatures. Nevertheless, when treatment with amine is done prior to lamination or support embedment, it becomes all the more important to heat treat such membranes only at lower temperatures and for times in accordance with the present invention so as to avoid unnecessary additional exposure to high temperature which may result in sufficient exposure to high temperature to result in the deleterious effects; the present invention as compared to the prior art procedure constitutes a more controllable method for governing the accumulated thermal history of the membrane.

As indicated above, heat treating according to the invention can be carried out on membranes which have been treated with amine on either one or both surfaces of the membrane. It is preferred, however, to heat treat membranes which have been treated on only one side as described in greater detail above. For any specific fluorinated polymer containing sulfonyl groups, the resistance of the polymer is greater when the sulfonyl groups are in the form of N-monosubstituted sulfonamide salt groups than when they are in the form of sulfonic acid salt groups. All other factors being equal, a membrane having only one layer in the N-monosubstituted sulfonamide salt form will operate in a chloralkali electrolysis cell at a lower voltage, and thus at greater economy, than a membrane having two such layers.

For any given membrane heat treated in accordance with the present invention, when compared with the same membrane before heat treatment, the current efficiencies during the first few days of operation are substantially identical. The operating voltages of a membrane before and after heat treatment, however, differ slightly, the voltage of the heat-treated membrane having increased, usually by an amount ranging from about a twentieth of a volt to a few tenths of a volt. Also, it is sometimes found that when two membranes of the same constitution are heat treated, the exact amount of the increase in voltage varies from one membrane to another. In general, heat treatment of membranes where reaction with amine is carried out before embedment of support material results in some increase in operating voltage, and heat treatment of membranes where reaction with amine is carried out after embedment of support material results in less increase in voltage, ranging from only a few tenths of a volt down to almost no increase. This observation constitutes yet another reason why it is preferred to carry out reaction with amine after support material has been embedded. Additionally, the smaller increases in voltage are more consistently observed when heat treatment is carried out at the relatively lower heat treating temperatures, e.g., in the range of 100° to 140° C., and thus this constitutes a preferred range of heat treating temperature.

The surface of the membrane wherein the polymer has been converted to N-monosubstituted sulfonamide groups can face either the anode or cathode in an electrolytic cell; in the case of a chloroalkali cell it should face the cathode.

To further illustrate the innovative aspects of the present invention, the following examples are provided.

In the examples, repeated reference will be made to two treating baths. Treating Bath A consists of 11 to 14% by weight potassium hydroxide, 30 to 36% by weight dimethylsulfoxide, and the balance water. Treating Bath B consists of 94 to 96% by weight ethylenediamine and 4 to 6% by weight water as determined with Karl Fischer reagent.

In the examples, the laminating equipment employed comprised a hollow roll with an internal heater and an internal vacuum source. The hollow roll contained a series of circumferential slots on its surface which allowed the internal vacuum source to draw web or sheet feed materials in the direction of the hollow roll. A curved stationary plate with a radiant heater faced the top surface of the hollow roll with a spacing of about ¼ inch between their two surfaces. As a portion of the laminating equipment, porous release paper was used in contacting the hollow roll as a support material to prevent adherence of polymer film to the roll surface and to allow vacuum to pull material being laminated in the direction of the hollow roll. Feed and takeoff means were provided for the materials being laminated. In the feed means one idler roll of smaller diameter than the hollow roll was provided for release paper and materials undergoing lamination. The feed and takeoff means were positioned to allow feed material to pass around the hollow roll over an area of about 5/6 of its circumference. A further idler roll was provided for the release paper allowing its separation from the other materials undergoing lamination. Takeoff means were provided for the release paper and a laminate. In formation of a laminate, a release paper having a weight basis of 0.171 kg/cm² (175 lbs/5000 ft²) manufactured by the Paper Corporation of United States, designated "Partwick Type 3300", was employed. This release paper had a minumum porosity specification of 150 cc of air per minute per cm² (0.035 standard ft³/min per in²) under an air pressure differential of 53,330 pascals (40 cm of mercury). In the lamination step the feed materials were fed to the hollow roll with the release paper contacting the hollow roll, contacting the release paper was the reinforcement fabric and contacting this fabric was the polymer film.

EXAMPLE 1

A film of copolymer of tetrafluoroethylene and perfluoro-3,6-dioxa-4-methyl-7-octenesulfonyl fluoride having an equivalent weight of 1150 and having a thickness of 0.15 mm (6 mils) was hydrolyzed on one surface to form potassium sulfonate groups to a depth of 0.013 mm (0.5 mil) by treating one side of the film with Treating Bath A at 59° C. for 8.5 minutes. The film was then reinforced according to U.S. Pat. No. 3,925,135 by embedding into the non-hydrolyzed side thereof, by vacuum lamination using apparatus as described above, a fabric of polytetrafluoroethylene fibers which is a warp knit with weft insertion having 4.7 200-denier threads per cm (12 threads per inch) in the warp and 5.9 400-denier threads per cm (15 threads per inch) in the fill (fabric designation T-25); the lamination was carried out with the fabric against the vacuum roll which was heated to 235° C., the film toward the curved stationary plate which is heated to 362° C., the vacuum in the vacuum roll being 78,000 pascals (23 inches of mercury), at a speed of 30.5 cm/min (1 ft/min). The resulting laminate was then immersed in Treating Bath B at 35° C. for 11 minutes, which resulted in a sulfonamide layer about 0.025 mm (1 mil) thick on the non-hydrolyzed side of the membrane and a second sulfonamide layer about 0.025 mm (1 mil) thick just beneath the hydrolyzed surface. The laminate was then immersed in Treating Bath A at 95° C. for 35 minutes to hydrolyze remaining sulfonyl fluoride groups to potassium sulfonate groups, and the resulting membrane was washed with acetic acid to leach excess potassium hydroxide from it.

As a control, one piece of the membrane was installed in a chlor-alkali cell with the exposed sulfonamide surface layer facing the cathode, and such that the active membrane area was 45.2 cm$^2$ (7 in$^2$). Saturated sodium chloride solution (brine) was electrolyzed with a current of 14 amperes (2 amps/in$^2$) at 80° C., using a brine flow rate of 0.4 ml/ampere-minute and addition to the brine of HCl at a rate of 0.14 mg/ampere-minute, and with water slowly added to the cathode compartment to maintain production of caustic at a goal concentration of about 28 to 30% by weight. The performance was as follows:

| Days | Current Efficiency % | Voltage | NaOH % by wt. |
| --- | --- | --- | --- |
| 1 | 89 | 4.0 | 28 |
| 5 | 85 | 3.9 | 27 |
| 16 | 85 | 3.8 | 27 |
| 23 | 83 | 3.7 | 28 |
| 28 | 83 | 3.8 | 27 |

A second piece of the same membrane was heated in a vacuum oven at 110° C. for 24 hours under a vacuum of about 95,000 pascals (28 inches of mercury). It was tested in a chlor-alkali cell as described above, except that the rate of HCl addition to the brine was 2.1 mg/ampere-minute. The performance was as follows:

| Days | Current Efficiency % | Voltage | NaOH % by wt. |
| --- | --- | --- | --- |
| 2 | 89 | 4.35 | 29 |
| 4 | 87.5 | 4.0 | 29 |
| 7 | 87.5 | 3.95 | 29 |
| 14 | 87 | 3.8 | 29 |
| 23 | 87 | 3.8 | 29 |

EXAMPLE 2

A piece of the membrane described in Example 1 was installed in a chlor-alkali cell with the exposed sulfonamide surface layer facing the cathode, and such that the active membrane area was 19.4 cm$^2$ (3 in$^2$). Sodium chloride solution was continuously fed to the anolyte chamber and a rate of 2.0 ml/ampere-minute and with addition of HCl to the brine at a rate of 1.3 mg/ampere-minute, and water was metered to the catholyte chamber to maintain the product caustic at a concentration of 24 to 31% NaOH by weight. The electrolysis current was 6 amps (2 amps/in$^2$) with an anolyte temperature of about 85° C. Cell performance for this control sample was as follows:

| Days | Current Efficiency (%) | Voltage | NaOH % by wt. |
| --- | --- | --- | --- |
| 4 | 93 | 3.7 | 31 |
| 14 | 87 | 3.6 | 26 |
| 24 | 86 | 3.6 | 24 |
| 60 | 84 | 3.6 | 24 |
| 90 | 85 | 3.6 | 26 |
| 120 | 85 | 3.6 | 26 |
| 150 | 84 | 3.7 | 26 |
| 180 | 84 | 3.7 | 26 |
| 210 | 84 | 3.6 | 28 |

Another piece of the same membrane was heated in an oven at 115° C. for 24 hours. It was treated in a chlor-alkali cell as described above. The performance was as follows:

| Days | Current Efficiency (%) | Voltage | NaOH % by wt. |
| --- | --- | --- | --- |
| 4 | 96 | 3.7 | 27 |
| 14 | 94 | 3.6 | 26 |
| 24 | 94 | 3.6 | 27 |
| 60 | 93 | 3.6 | 27 |
| 90 | 93 | 3.6 | 27 |
| 120 | 92 | 3.6 | 27 |
| 150 | 90 | 3.6 | 26 |
| 180 | 90 | 3.6 | 26 |
| 210 | 90 | 3.6 | 27 |

EXAMPLE 3

Another piece of the same membrane as described in Example 1 was heated at 160° C. for two hours. The performance in a chlor-alkali cell as described in Example 2 was as follows:

| Days | Current Efficiency (%) | Voltage | NaOH % by wt. |
| --- | --- | --- | --- |
| 8 | 95.4 | 3.88 | 27.1 |
| 18 | 94.7 | 3.87 | 26.6 |
| 28 | 92.0 | 3.91 | 27.0 |
| 38 | 91.5 | 3.93 | 26.8 |
| 48 | 89.3 | 4.05 | 27.2 |
| 58 | 87.8 | 4.13 | 28.0 |

EXAMPLE 4

A film of copolymer of tetrafluoroethylene and perfluoro-3,6-dioxa-4-methyl-7-octenesulfonyl fluoride having an equivalent weight of 1100 and having a thickness of 0.125 mm (5 mils) was hydrolyzed on one surface to form potassium sulfonate groups to a depth of 0.017 mm (0.66 mil) by treating one side of the film with Treating Bath A at 61° C. for 13 minutes. The film was then reinforced as described in Example 1, except that the fabric was a calendered warp knit with weft insertion of 200-denier polytetrafluoroethylene fibers, having 5.1 threads per cm (13 threads per inch) in the warp and 6.3 threads per cm (16 threads per inch) in the fill (fabric designation T-28C). In a second similar laminating step, to the non-hydrolyzed side of the resulting supported film was laminated a film of a copolymer of tetrafluoroethylene and perfluoro-3,6-dioxa-4-methyl-7- octenesulfonyl fluoride having an equivalent weight of 1200 and a thickness of 0.05 mm (2 mils). The resulting laminar film was treated on one side only, the 1200 equivalent weight side, with Treating Bath B at 24° C. for 35 minutes, which resulted in a sulfonamide layer on that surface to a depth of 0.024 mm (0.96 mil, average of six determinations). The laminate was then immersed in Treating Bath A at 90° C. for 70 minutes, to hydrolyze remaining sulfonyl fluoride groups, and the resulting membrane was washed with water. The membrane was dried in air, and then heated in a vacuum oven at 110° C. for 17 hours under a vacuum of about 95,000 pascals (29 inches of mercury). It was tested in a chlor-alkali cell as described in Example 1 except that the brine flow rate was 1.1 ml/ampere-minute and the HCl addition to the brine was 0.4 mg/ampere-minute. The performance was as follows:

| Days | Current Efficiency % | Voltage | NaOH % by wt. |
|---|---|---|---|
| 3 | 89.4 | 4.28 | 32.0 |
| 7 | 92.8 | 4.30 | 30.5 |
| 21 | 89.0 | 4.28 | 30.9 |
| 33 | 94.2 | 4.25 | 27.8 |
| 56 | 85.5 | 4.46 | 28.5 |
| 63 | 86.0 | 4.44 | 28.2 |

EXAMPLE 5

A film of copolymer of tetrafluoroethylene and perfluoro-3,6-dioxa-4-methyl-7-octenesulfonyl fluoride having an equivalent weight of 1200 and a thickness of 0.175 mm (7 mils) was treated on only one surface by contact with Treating Bath B at 35° C. for 21 minutes to form a sulfonamide layer 0.036 mm (1.4 mils) thick. The film was then reinforced by embedding into the side which remained in the sulfonyl fluoride form, using apparatus as described above, a fabric or 400-denier polytetrafluoroethylene fibers which is a basket weave having 16.5 threads per cm (42 threads per inch) in both warp and weft (fabric designation T-12); the lamination was carried out with the fabric against the vacuum roll which was heated to 240° C., the film toward the curved stationary plate which was heated to 330° C., the vacuum in the vacuum roll being 74,000 pascals (22 inches of mercury), at a speed of 61 cm/min (2 ft/min.). The resulting laminate was then immersed in Treating Bath A at 95° C. for 1 hour, and then washed with acetic acid.

As a control one piece of the membrane was tested in a chlor-alkali cell as described for the control in Example 1. The performance was as follows:

| Days | Current Efficiency % | Voltage | NaOH % by wt. |
|---|---|---|---|
| 2 | 96 | 4.8 | 30 |
| 3 | 92 | 5.1 | 31 |
| 4 | 86 | 5.1 | 30 |
| 7 | 89 | 5.0 | 32 |
| 8 | 88 | 5.0 | 31 |
| 10 | 87 | 5.0 | 30 |
| 11 | 85 | 5.1 | 30 |
| 24 | 85 | 5.1 | 27 |
| 31 | 86 | 5.1 | 27 |

A second piece of the same membrane was heated in a vacuum oven at 110° overnight (about 16 hours) under a vacuum of about 95,000 pascals (28 inches of mercury). It was tested in a chlor-alkali cell as described for the control above. The performance was as follows:

| Days | Current Efficiency % | Voltage | NaOH % by wt. |
|---|---|---|---|
| 1 | 96 | 4.5 | 28 |
| 2 | 95 | 4.7 | 29 |
| 5 | 90 | 4.7 | 29 |
| 8 | 90 | 4.7 | 29 |
| 12 | 90 | 4.7 | 28 |
| 16 | 90 | 4.6 | 27 |
| 26 | 89 | 4.6 | 28 |
| 34 | 85 | 4.8 | 29 |
| 41 | 83 | 4.8 | 28 |
| 44 | 86 | 4.7 | 28 |

EXAMPLE 6

Example 1 was repeated except as follows. Surface hydrolysis to form potassium sulfonate groups was to a depth of 0.18 mm (0.72 mil) by treating one side with Treating Bath A at 64° C. for 4 minutes. The reinforcement fabric was T-28C (described in Example 4) and the vacuum roll was at 232° C. and the curved plate at 339° C. The laminate was immersed in Treating Bath B at 24.5° C. for 32.5 minutes, which formed two sulfonamide layers each about 0.022 mm (0.87 mil) thick, one on the non-hydrolyzed side of the membrane and the other under the hydrolyzed surface. Hydrolysis of remaining sulfonyl fluoride groups was carried out in Treating Bath A at 90° C. for 2 hours. As a control, one piece of the membrane was tested in electrolysis of brine as in Example 1, except that the brine flow rate was 0.89 ml/ampere-minute and the rate of HCl addition to the brine was 1.56 mg/ampere-minute. The performance was as follows:

| Days | Current Efficiency (%) | Voltage | NaOH % by wt. |
|---|---|---|---|
| 3 | 87 | 3.96 | 31.5 |
| 6 | 88.5 | 3.95 | 31 |
| 11 | 87 | 3.90 | 30 |
| 24 | 83 | 3.86 | 28 |

A second piece of the same membrane was heated in a vacuum oven at 110° C. for 15.5 hours under a vacuum of about 95,000 pascals (28 inches of mercury) with a slow bleed of nitrogen into the oven. It was tested as above, with performance as follows:

| Days | Current Efficiency (%) | Voltage | NaOH % by wt. |
|---|---|---|---|
| 1 | 91 | 4.28 | 34 |
| 4 | 91 | 4.13 | 31 |
| 11 | 90 | 4.03 | 30 |
| 21 | 89 | 4.01 | 29 |
| 32 | 87 | 4.09 | 28.5 |

EXAMPLE 7

Example 1 was repeated except as follows. The film of copolymer of the same monomers had an equivalent weight of 1100 and a thickness of 0.18 mm (7 mils). Surface hydrolysis to form potassium sulfonate groups was to a depth of 0.020 mm (0.77 mil) by treating one side with Treating Bath A at 69° C. for 3.5 minutes. The reinforcement fabric was T28C (described in Example 4), the vacuum roll was at 228° C. and the curved plate at 338° C., the vacuum in the vacuum roll being 74,000 pascals. The laminate was immersed in Treating Bath B at 24.5° C. for 26 minutes, which formed two sulfonamide layers each about 0.028 mm (1.1 mil) thick, one on the non-hydrolyzed side of the membrane and the other under the hydrolyzed surface. Hydrolysis of remaining sulfonyl fluoride groups was carried out in Treating Bath A at 90° C. for 1.5 hours. As a control, one piece of the membrane was tested in electrolysis of brine as in Example 6, except that the brine flow rate was 0.9 ml/ampere-minute. The performance was as follows:

| Days | Current Efficiency (%) | Voltage | NaOH % by wt. |
|---|---|---|---|
| 1 | 89 | 4.16 | 30.5 |
| 4 | 85 | 3.92 | 29 |
| 11 | 81 | 3.90 | 27 |
| 15 | 74 | 4.00 | 27 |

A second piece of the same membrane was heated in a vacuum oven at 110° C. for 16 hours under a vacuum of about 95,000 pascals. It was tested as above. The performance was as follows.

| Days | Current Efficiency (%) | Voltage | NaOH % by wt. |
|---|---|---|---|
| 1 | 91 | 4.48 | 32 |
| 4 | 91.5 | 4.02 | 31 |
| 15 | 89.5 | 3.94 | 30.5 |
| 32 | 87 | 4.00 | 29 |
| 39 | 87 | 4.01 | 29 |

EXAMPLE 8

Another piece of the membrane prepared in Example 5 was heated in a vacuum oven at 135° C. for 2 hours under a vacuum of about 95,000 pascals. It was tested as in Example 7. The performance was as follows.

| Days | Current Efficiency (%) | Voltage | NaOH % by wt. |
|---|---|---|---|
| 1 | 91 | 4.33 | 31 |
| 8 | 91 | 4.10 | 30 |
| 16 | 88 | 4.33 | 29 |
| 26 | 87 | 4.37 | 29 |

EXAMPLE 9

Another piece of the membrane prepared in Example 5 was heated in a vacuum oven at 150° C. for 2.5 hours under a vacuum of about 95,000 pascals. It was tested as in Example 7. The performance was as follows.

| Days | Current Efficiency (%) | Voltage | NaOH % by wt. |
|---|---|---|---|
| 1 | 89 | 4.54 | 31.5 |
| 4 | 92 | 4.52 | 30 |
| 14 | 92 | 4.46 | 30 |
| 21 | 91 | 4.30 | 30 |

-continued

| Days | Current Efficiency (%) | Voltage | NaOH % by wt. |
|---|---|---|---|
| 31 | 90 | 4.24 | 29 |
| 46 | 87.5 | 4.38 | 29 |

Industrial Applicability

Heat-treated membranes of the present invention have utility to function for ion exchange. Accordingly, general utility of such structures for ion exchange is directly contemplated. Illustratively, permeation selection of cations is directly encompassed. One method of determination of cation exchange properties is a measurement of permselectivity with separation of the same cations in solutions but at different concentrations. This involves cation transport, and a permselectivity measurement of no voltage would indicate the polymer does not function for ion exchange.

A specific use for the heat-treated membranes of the invention is in a chlor-alkali cell, such as disclosed in German patent application No. 2,251,660, published Apr. 26, 1973, and Netherlands patent application No. 72.17598, published June 29, 1973. In a similar fashion as these teachings, a conventional chlor-alkali cell is employed with the critical distinction of the type of polymeric structure used to separate the anode and cathode portions of the cell. While the description of said German and Dutch publications is directed to use in a chlor-alkali cell, it is within the scope of the present disclosure to produce alkali metal hydroxides and halogen such as chlorine from a solution of the alkali metal salt. While efficienices in current and power consumption may vary, the operating conditions of the cell are similar to those disclosed for sodium chloride.

An outstanding advantage has been found in terms of long-term current efficiency in a chlor-alkali cell with the heat-treated membranes disclosed herein.

We claim:

1. The process of heating a membrane which has a first layer formed from an intermediate fluorinated polymer containing pendant sulfonyl halide groups attached to carbon atoms which have at least one fluorine atom connected thereto, said polymer having an equivalent weight in the range of 700 to 1600, at least 40% of the sulfonyl halide groups to a depth of at least $2 \times 10^{-5}$ mm of said intermediate polymer on at least one side of said first layer having been reacted with a di- or polyamine wherein one amino group is primary and a second amino group is primary or secondary, said first layer being unsupported or having support material consisting of inert fibers therein, to a temperature of 100° to 160° C. for a time of at least 15 minutes.

2. The process of claim 1 wherein said membrane has a second layer, said second layer being integral with said first layer and being of a fluorinated polymer having pendant side chains containing sulfonyl groups wherein the sulfonyl groups are in the —SO$_3$M form wherein M is an alkali metal or NH$_4$, the fluorinated polymer of each layer has an equivalent weight in the range of 1000 to 1300, said first layer having said support material therein in the form of a fabric of fibers of perfluorinated polymer, at least 40% of the sulfonyl halide groups to a depth of at least $10^{-3}$ mm of said intermediate polymer on at least the exposed side of said first layer having been reacted with a diamine having 2 or 3 carbon atoms.

3. The process of claim 2 wherein said time is from 30 minutes to 2 days.

4. The process of claim 3 wherein the fluorinated polymer of each layer has an equivalent weight in the range of 1025 to 1200, and said diamine is ethylenediamine.

5. The process of claim 4 wherein said temperature is 100° to 140° C. and said time is from 2 hours to 1 day.

6. The process of claim 5 wherein said fluorinated polymer is a copolymer of tetrafluoroethylene and perfluoro(3,6-dioxa-4-methyl-7-octenesulfonyl fluoride).

7. The process of claim 6 wherein said fabric support material has been embedded in said first layer before reaction of the first layer with said di- or polyamine.

8. The process of claim 7 wherein only the exposed side of the first layer has been reacted with the amine.

9. The process of claim 7 wherein both sides of the first layer have been reacted with said amine.

10. The process of claim 6 wherein only the exposed side of the first layer has been reacted with the amine.

11. The process of claim 6 wherein both sides of the first layer have been reacted with said amine.

12. The process of claim 4 wherein only the exposed side of the first layer has been reacted with the amine.

13. The process of claim 4 wherein both sides of the first layer have been reacted with said amine.

14. The process of claim 2 wherein only the exposed side of the first layer has been reacted with the amine.

15. The process of claim 2 wherein both sides of the first layer have been reacted with said amine.

16. A process which comprises the steps:
(A) treating a laminar membrane comprising
   (i) a first layer of fluorinated polymer having pendant side chains containing sulfonyl groups wherein the sulfonyl groups are in the —$SO_2X$ form wherein X is F or Cl, said first layer having support material consisting of fiber of inert polymer therein, and
   (ii) a second layer of fluorinated polymer having pendant side chains containing sulfonyl groups wherein the sulfonyl groups are in the —$SO_3M$ form wherein M is an alkali metal or $NH_4$, said second layer being integral with said first layer, fluorinated polymer of each layer having an equivalent weight in the range of 700 to 1600,
on at least the exposed surface of said first layer with a di- or polyamine wherein one amino group is primary and a second amino group is primary or secondary, until at least 40% of said —$SO_2X$ groups to a depth of at least $2 \times 10^{-5}$ mm in said first layer have reacted with said di- or polyamine;

(B) hydrolyzing any remaining —$SO_2X$ groups in said laminar membrane; and (C) heating said laminar membrane to a temperature of 100° to 160° C. for a time of at least 15 minutes.

17. The process of claim 16 wherein in step (A) the fluorinated polymer of each layer has an equivalent weight in the range of 1000 to 1300, said support material is a fabric of fibers of perfluorinated polymer, and said treating is with a diamine having 2 or 3 carbon atoms and is to a depth of at least $10^{-3}$ mm.

18. The process of claim 17 wherein in step (C) said time is from 30 minutes to 2 days.

19. The process of claim 18 wherein in step (A) the fluorinated polymer of each layer has an equivalent weight in the range of 1025 to 1200, and said diamine is ethylenediamine.

20. The process of claim 19 wherein in step (C) said temperature is from 100° to 140° C. and said time is from 2 hours to 1 day.

21. The process of claim 20 wherein said fluorinated polymer is a copolymer of tetrafluoroethylene and perfluoro(3,6-dioxa-4-methyl-7-octenesulfonyl fluoride).

22. The process of claim 21 wherein in step A only the exposed surface of said first layer is treated with the amine.

23. The process of claim 21 wherein in step A both surfaces of said laminar membrane are treated with said amine.

24. The membrane produced by the process of claims 1, 7, 10, 8, 11, 9, 16, 22, or 23.

25. In a process for production of halogen and an alkali metal hydroxide by electrolysis of a halide of said alkali metal in an electrolytic cell having anode and cathode compartments separated by a membrane, the improvement comprising passing ions of said metals through a membrane of claim 24.

26. The process of claim 19 wherein in step A only the exposed surface of said first layer is treated with the amine.

27. The process of claim 19 wherein in step A both surfaces of said laminar membrane are treated with said amine.

28. The process of claim 17 wherein in step A only the exposed surface of said first layer is treated with the amine.

29. The process of claim 17 wherein in step A both surfaces of said laminar membrane are treated with said amine.

* * * * *